US008703255B2

(12) United States Patent
Kasperchik et al.

(10) Patent No.: US 8,703,255 B2
(45) Date of Patent: Apr. 22, 2014

(54) PRINTED ARTICLES WITH OPTICALLY VARIABLE PROPERTIES

(75) Inventors: Vladek Kasperchik, Corvallis, OR (US); Tienteh Chen, San Diego, CA (US); Mohammed S. Shaarawi, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/819,928

(22) PCT Filed: Oct. 22, 2010

(86) PCT No.: PCT/US2010/053699
§ 371 (c)(1), (2), (4) Date: Feb. 28, 2013

(87) PCT Pub. No.: WO2012/054053
PCT Pub. Date: Apr. 26, 2012

(65) Prior Publication Data
US 2013/0161939 A1 Jun. 27, 2013

(51) Int. Cl.

| | |
|---|---|
| ***B41M 3/00*** | (2006.01) |
| ***B41M 5/00*** | (2006.01) |
| ***B41M 5/50*** | (2006.01) |
| ***B05D 5/06*** | (2006.01) |
| ***B41J 2/215*** | (2006.01) |
| ***B42D 15/00*** | (2006.01) |
| ***C09D 11/037*** | (2014.01) |
| ***C09D 11/322*** | (2014.01) |

(52) U.S. Cl.
USPC .................... 428/32.25; 106/31.65; 106/31.9; 347/105; 428/32.32

(58) Field of Classification Search
CPC .................. B05D 5/066–5/068; B41M 3/008; B41M 5/0023; B41M 5/502; B41M 5/506; B41M 5/508; B41J 2/215; C09D 11/037; C09D 11/322
USPC ............ 106/31.65, 31.9; 347/105; 428/32.25, 428/32.32
See application file for complete search history.

(56) References Cited

U.S. PATENT DOCUMENTS

| | | | |
|---|---|---|---|
| 4,358,779 | A | 11/1982 | Hohn et al. |
| 6,472,455 | B1 | 10/2002 | Bleikolm et al. |
| 6,710,103 | B2 | 3/2004 | Norris et al. |
| 6,830,327 | B2 | 12/2004 | Asakawa |
| 7,381,758 | B2 | 6/2008 | Vuarnoz et al. |
| 2003/0186020 | A1 | 10/2003 | Kasahara |
| 2007/0281136 | A1 | 12/2007 | Hampden-Smith et al. |
| 2007/0281140 | A1 | 12/2007 | Haubrich et al. |
| 2010/0151047 | A1 | 6/2010 | Pfaff et al. |

FOREIGN PATENT DOCUMENTS

| | | |
|---|---|---|
| EP | 1144711 B1 | 4/2003 |
| JP | 2005-280093 | 10/2005 |
| WO | WO 2009/016056 | 2/2009 |

OTHER PUBLICATIONS

International Search Report and Written Opinion for PCT/US2010/053699 dated Jul. 7, 2011 (9 pages).

*Primary Examiner* — Bruce H Hess

(57) ABSTRACT

A printed article with optically variable properties that includes a printable media on which a printed feature has been formed with an ink composition. Said ink composition contains metal oxide particles that have an average particle size in the range of about 3 to about 180 nm and that have a refractive index superior or equal to 1.2. The printable media contains a bottom supporting substrate, an ink-absorbing layer and a metallized top layer with pore diameters that are smaller than the size of the metal oxide particles, and the ink composition forms, onto the printable media, a printed feature that exhibits optically variable properties.

15 Claims, 4 Drawing Sheets

PRINTED ARTICLES WITH OPTICALLY VARIABLE PROPERTIES

BACKGROUND

Inkjet technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of substrates. Current inkjet printing technology involves forcing the ink drops through small nozzles by thermal ejection, piezoelectric pressure or oscillation, onto the surface of a media.

In inkjet printing method, both the print media and the ink play a key role in the overall image quality and permanence of the printed images and articles. Thus, it has often created challenges to find media and ink which can be effectively used with such printing techniques and which impart good image quality. In addition, nowadays, prints and printed articles with specific characteristics and appearances are often wanted.

As an example, recent advances in color copying and printing have put increasing importance on developing new methods to prevent forgery of security documents such as banknotes. While there have been many techniques developed, one area of increasing interest is in developing security features that cannot be readily reproduced, particularly by a color copier or printer. One approach that has been taken is to create a printed image that is visually distinct from its reproduction, such as, for examples, printed image that exhibit variable optical properties and/or that have the ability to create reflective features, e.g., reflective security features that display variable information.

Accordingly, investigations continue into developing media, ink and/or printed articles that exhibit such specific properties such as, for examples, variable optical properties.

BRIEF DESCRIPTION OF THE DRAWING

The drawings illustrate various embodiments of the present system and method and are part of the specification.

DETAILED DESCRIPTION

Before particular embodiments of the present invention are disclosed and described, it is to be understood that the present disclosure is not limited to the particular process and materials disclosed herein. It is also to be understood that the terminology used herein is used for describing particular embodiments only and is not intended to be limiting, as the scope of the present invention will be defined only by the claims and equivalents thereof. In describing and claiming the present article and method, the following terminology will be used: the singular forms “a”, “an”, and “the” include plural referents unless the context clearly dictates otherwise. Thus, for example, reference to “a pigment” includes reference to one or more of such materials. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc. Wt % means herein percentage by weight. All percents are by weight unless otherwise indicated.

The present disclosure refers to a printed article that exhibits optically variable properties. In some embodiments, the printed article contains a printable media on which a printed feature, that exhibits optically variable properties, has been formed with an ink composition. As described herein, the ink composition that is applied to the printable media encompasses metal oxide particles that have an average particle size in the range of about 3 to about 180 nm and that have a refractive index superior or equal to 1.2. Said printable media contains a bottom supporting substrate, an ink-absorbing layer and a metalized top layer with pore diameters that are smaller than the size of the metal oxide particles.

Figure 1:
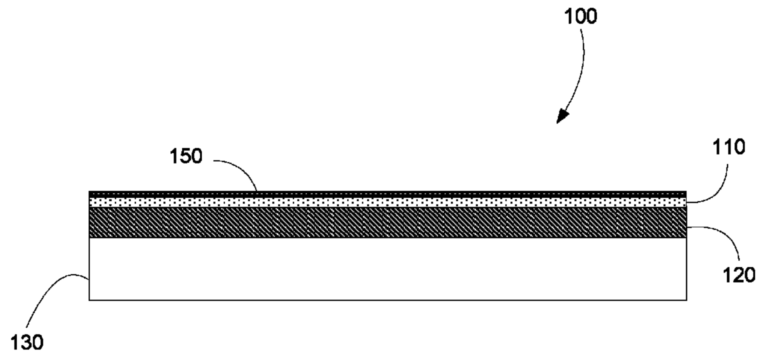
FIG. 1 is a cross-sectional view of a printed article, with coating layers and a printed feature applied to one side of the supporting substrate, according to some embodiments of the present disclosure.
Figure 2:
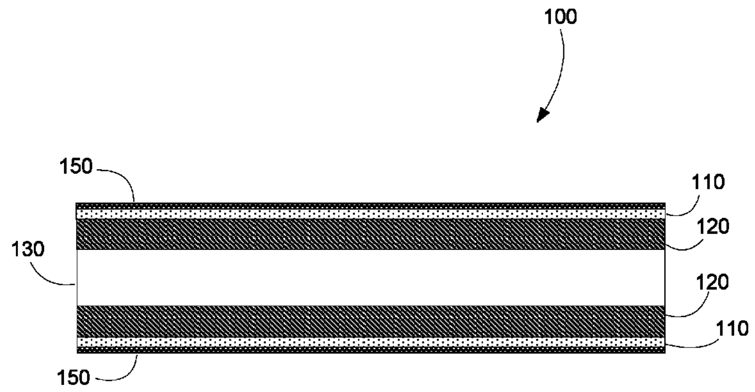
FIG. 2 is a cross-sectional view of a printed article, including coating layers and printed features that are applied to both sides of the supporting substrate, according to some embodiments of the present disclosure.

In some examples, such as illustrated in FIGS. 1 and 2, the printed article (100) contains a printed feature (150) and a printable media that encompass a reflective metal layer (110), an ink-absorbing layer (120) and a bottom supporting substrate (130).

Such as illustrated in FIG. 1, the metal oxide printed feature (150), the reflective metal layer (110) and the ink-absorbing layer (120) can be applied to only one side of the supporting substrate (130). If the coated side is used as an image-receiving side, the other side, i.e. backside, may not have any coating at all, or may be coated with other chemicals (e.g. sizing agents) or coatings to meet certain features such as to balance the curl of the final product or to improve sheet feeding in printer. Such as illustrated in FIG. 2, the printed feature (150), the reflective metal layer (110) and the ink-absorbing layer (120) can be applied to both opposing sides of the supporting substrate (130).

Figure 3:
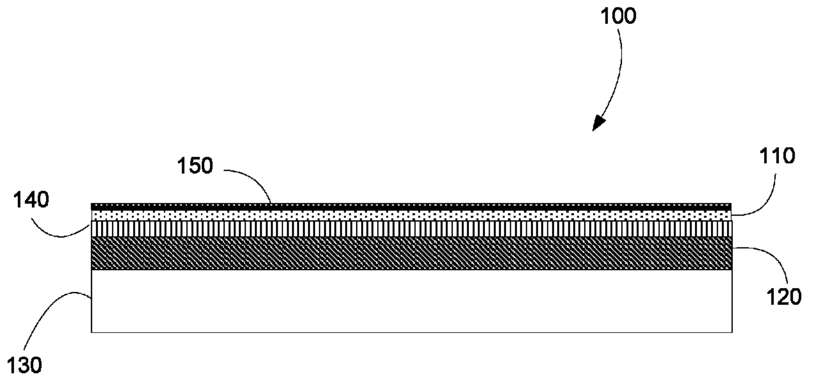
FIG. 3 is a cross-sectional view of a printed article, including coating layers and printed feature that are applied to one side of the supporting substrate, according to some other embodiments of the present disclosure.
Figure 4:
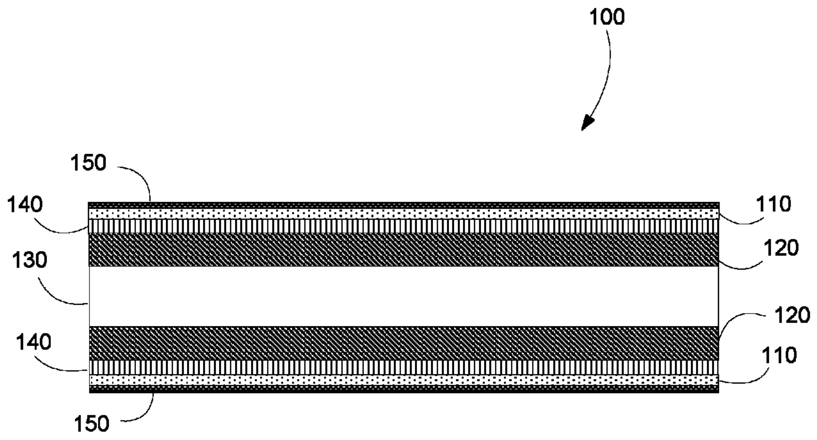
FIG. 4 is a cross-sectional view of a printed article, including coating layers and printed feature that are applied to both sides of the supporting substrate, according to some other embodiments of the present disclosure.

In some examples, as illustrated in FIGS. 3 and 4, the printed article (100) contains a metal oxide printed feature (150) and a printable media that encompasses a supporting substrate (130), a reflective metal layer (110), an ink-absorbing layer (120) and a glossy porous protective layer (140), applied over the ink-absorbing layer (120), that are applied to at least one surface of said substrate (130).

In some examples, such as illustrated in FIG. 3, the printable media encompasses a glossy porous protective layer (140), an ink-absorbing layer (120) and a reflective metal layer (110) that are applied to only one side of the supporting substrate (130). In some other examples, such as illustrated in FIG. 4, the printable media encompass a glossy porous protective layer (140), a reflective metal layer (110) and an ink-absorbing layer (120) that are applied to both opposing sides of the supporting substrate (130). The double-side coated media has a sandwich structure, i.e., both sides of the supporting substrate (130) are coated with the same coating and both sides may be printed with metal oxide printed feature (150).

The printed article such as defined herein is a printable media on which a printed feature has been formed using printing technique. In some examples, such printing technique is an inkjet printing technique. The printed feature has been formed by application of a specific ink composition. Such ink composition contains metal oxide particles that have an average particle size in the range of about 3 to about 180 nm and that have a refractive index superior or equal to 1.2. The printable media used herein contains, at least, a top metal layer (110), on which the printed feature is formed, a porous ink-absorbing layer (120) underneath the top metal layer and a supporting substrate (130).

In some examples, the printed article (100) contains of a printable media on which a printed feature or film has been formed via inkjet printing with said specific ink. The ink composition forms, thus, on the media a uniform coating that has optically variable properties. Said uniform coating, with optically variable properties, can be defined as the metal oxide coating or as the printed feature (150). The resulting printed article exhibits therefore optically variable properties.

Indeed, the printed feature (150) optically interacts with the top metal layer (110) of the printable media and results in printed article with optically variable properties. As "optically variable properties", it is meant herein that the object exhibits color shifting or dichroic properties. The term "color shifting" refers to the change in color depending on viewing angle. The term "dichroic" is defined, herein, as the property of having more than one color when viewed from different angles. The term "dichroic" refers also to object having a transmitted color that is completely different from a reflected color as certain wavelengths of light either pass through or are reflected, causing an array of colors to be displayed. Without being linked by any theory, it is believed that the optically variable properties disclosed herein are created through the interaction and combination of the specialty ink and the printable media. Indeed, the ink itself does not possess any optically variable character.

The printed article of the present disclosure can be useful for forming printed images that have, for examples, decorative applications, such as greeting cards, scrapbooks, brochures, signboards, business cards, certificates, and other like applications. The printed article can also be useful, for example, for forming printed article or images that will be used as anti-counterfeiting measure. The printed articles having optically variable property such as defined herein, can also be used to print security features on banknotes and security documents, as an anti-counterfeiting measure, because such security features cannot be easily reproduced by generally available color copiers, scanners and printers.

The ink composition, containing metal oxide particles or the insoluble metal salt particles, forms onto the above-mentioned printable media, a printed feature (150) that can be considered as a metal oxide coating. Said printed feature, or metal oxide coating (150), can have a thickness that is between about 40 and about 600 nm; in some other examples, that is between about 50 and about 400 nm; in yet some other examples, that is between about 60 and about 350 nm. In some examples, the thickness of the printed feature (150), present on the printable, media may be adjusted to be in the range of about ¼ to about ½λ of the visible light.

In some examples, the printed feature, or metal oxide coating, (150) of the printed article (100) has a density in the range about 3 to about 80 $\mu g/cm^2$. In some other examples, the printed feature (150) has a density in the range of about 4 to about 60 $\mu g/cm^2$; and, in yet some other examples, in the range of about 10 to about 40 $\mu g/cm^2$. In some examples, the metal oxide printed feature (150) is formed by using inkjet printing technique.

In some examples, the ink used to be printed on the printable media and that forms the metal oxide printed feature (150) does not have any optically variable properties and contains colorless metal oxide or/and insoluble metal salt particles. As used herein, the term "metal oxide particles" encompasses metal oxide particles or the insoluble metal salt particles. The "metal oxide particles", disclosed herein, are particles of metal oxide that have high refractive index (i.e. more than 1.2) and that have particle size in the nano range such that they are substantially transparent to the naked eye.

In some examples, the metal oxide and insoluble metal salt are either colorless or have rather weak coloration in thin layers. Without being bound by any theory, it is believed that the metal oxide particles, in themselves, do not exhibit optical variable properties for producing color-shifting effect.

In some examples, the average size of the metal oxide particles is smaller than ¼ wavelength (¼λ) of the visible wavelength. The visible wavelength is ranging from about 400 to about 700 nm. Therefore, the average size of the metal oxide particles is comprised between about 3 and about 180 nm. The average size of the metal oxide particles may also be comprised between about 5 and about 150 nm. In some examples, the average size of the metal oxide particles is comprises between about 10 and about 130, and, in some other examples, the average size of the metal oxide particles is comprises between about 10 and about 100.

In some examples, the refractive index of the metal oxide particles is superior or equal to 1.2. In some other examples, the refractive index of the metal oxide particles is in the range of about 1.5 to about 3.0. The refractive index, or index of refraction, of the metal oxide particles is a measure of the speed of light in metal oxide particles. It is expressed as a ratio of the speed of light in vacuum relative to that in the particles medium.

Suitable metal oxide and insoluble metal salt materials for the particles may be selected from the group consisting of $TiO_2$, $Al_2O_3$, AlO(OH), ZnO, $ZrO_2$, $Fe_2O_3$, $V_2O_5$, MgO, $Cr_2O_3$, $CeO_2$, $Nb_2O_5$, $SiO_2$, $Ta_2O_5$, $AlPO_4$, $CaCO_3$, $Ca_2P_2O_7$, $Zn_2SiO_4$, etc. In some examples, metal oxide particles are selected from the group consisting of $TiO_2$, $Al_2O_3$, ZnO, $ZrO_2$ and $AlPO_4$. In some other examples, the metal oxide particles are $TiO_2$.

In some embodiments, the metal oxide particles are dispersed in a liquid carrier in view of forming a jettable ink composition that is suitable for inkjet printing. In some examples, the ink composition is an inkjet ink composition that contains, at least, metal oxide particles and an aqueous carrier. In some other examples, the ink composition contains a metal oxide or/and insoluble metal salt particles, a dispersant and a liquid carrier. The amount of the metal oxide particles, present in the ink composition, can represent from about 0.1 to about 25 wt % of the total weight of the ink composition. In some examples, the amount of the metal oxide particles, present in the ink composition, represents from about 0.2 to about 12 wt %, and, in some other examples, from about 0.3 to about 6 wt % by total weight of the ink composition.

In some examples, the ink composition used to form the printed feature (150), or metal oxide coating, of the printed article (100) contains $TiO_2$ as metal oxide particles. In some other examples, the ink composition contains an ink liquid vehicle and a colloid dispersion of metal oxide particles or of insoluble metal salt particles.

In some examples, the ink composition comprises an ink liquid vehicle and a colloid dispersion of metal oxide particles, said dispersion of particles represents from about 0.1 to about 25 wt % of the total weight of the ink composition.

As used herein, "liquid vehicle" is defined to include any liquid composition that is used to carry the metal oxide particles to the substrate. A wide variety of liquid vehicle components may be used herein. Such liquid vehicle may include a mixture of a variety of different agents, including without limitation, surfactants, solvent and co-solvents, buffers, biocides, viscosity modifiers and water. In some examples, the liquid vehicle is an inkjet liquid vehicle. Organic solvents can be part of the liquid vehicle. Any suitable organic solvents can be used. Examples of suitable classes of organic solvents include polar solvents such as amides, esters, ketones, lactones and ethers. Examples of organic solvents also include N-methylpyrrolidone (NMP), dimethyl sulfoxide, sulfolane, and glycol ethers. The solvent can be used in an amount representing from about 0.1 to about 30 weight percentage of the ink composition or can be used in an amount representing from about 8 to about 25 weight percentage of the ink composition. The ink composition can include water. Such water can be used as the ink carrier for the composition and can be part of the liquid vehicle. The water can make up the balance of the ink composition, and may be present in an amount representing from about 40 to about 95 weight percentage, or may be present in an amount representing from about 50 to about 90 weight percentage by weight of the total composition. In addition to water, various types of agents may be employed in the ink composition to optimize the properties of the ink composition for specific applications. The ink composition may also include any number of buffering agents and/or biocides. Examples of suitable biocides include, but are in no way limited to, benzoate salts, sorbate salts, commercial products such as Nuosept® (ISP), Ucarcide® (Dow), Vancide® (RT Vanderbilt Co.), and Proxel® (Avecia), Kordek® MLX (Rohm and Haas) and other known biocides. Such biocides may be contained in amount representing less than about 5 weight percentage of the ink composition. Surfactants can also be used and may include water-soluble surfactants such as alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, fluorosurfactants, and mixtures thereof. In some examples, fluorosurfactants or ethoxylated surfactants can be used as surfactants. If used, the surfactant can be present at from about 0.001 to about 10 weight percentage, and, in some examples, can be present at from about 0.01 to about 3 weight percentage of the ink composition.

In some examples, the ink composition is a colorless ink, which means thus that the ink is void of any organic colorant (pigment or dye) for creating visible colors, and is semi-transparent or transparent.

In some embodiments, the ink composition comprises a dispersant. In some examples, the metal oxide particles, present in the ink composition, are dispersed with dispersants. Without being linked by any theory, it is believed that the presence of a dispersant in the ink composition improves the dispersibility of the metal oxide particles and the long-term storage stability of the ink. The metal oxide particles or the insoluble metal salt particles can be dispersed with dispersants. Examples of suitable dispersants include, but are not limited to, water-soluble anionic species of low and high molecular weight such as phosphates and polyphosphates, carboxylates (such as oleic acid), polycarboxylates (such as acrylates and methacrylates). Other examples include hydrolysable alkoxysilanes with alkoxy group attached to water-soluble (hydrophilic) moieties such as water-soluble polyether oligomer chains.

In some examples, the dispersant used to dispersed the metal oxide particles of the ink composition is a reactive silane coupling agents containing hydrophilic functional groups, such as amino, diamino, triamino, ureido, poly (ether), mercapto, glycidol functional groups and their hydrolysis product. Examples of the silane coupling agents suitable as dispersants for metal oxides are (aminoethyl)aminopropyl-triethoxysilane, (aminoethyl)aminopropyl-trimethoxysilane, (aminoethyl)aminopropyl-methyldimethoxysilane, aminopropyl-triethoxysilane, aminopropyl-trimethoxysilane, glycidolpropyl-trimethoxysilane, ureidopropyltrimethoxysilane, and polyether triethoxysilane, polyether trimethoxysilane hydrolysis product of aminopropyl-trimethoxysilane, and hydrolysis product of (aminoethyl) minopropyl-trimethoxysilane. In some examples, the dispersants used to disperse metal oxide particles or the insoluble metal salt particles, of the ink composition, is a polyether alkoxysilane dispersant.

Examples of polyether alkoxysilane dispersants used to dispersed metal oxide particles or the insoluble metal salt particles can represented by the following general Formula (I):

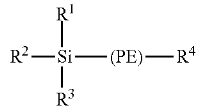

(I)

Wherein:

a) $R^1$, $R^2$ and $R^3$ are hydroxy groups, linear or branched alkoxy groups. In some examples, $R^1$, $R^2$ and $R^3$ are linear alkoxy groups having from 1 to 5 carbon atoms. In some other examples, $R^1$, $R^2$ and $R^3$ groups are $—OCH_3$ or $—OC_2H_5$;

b) PE is a polyether oligomer chain segment of the structural formula $[(CH_2)_n—CH—R—O]_m$, wherein n is an integer ranging from 0 to 3, wherein m is an integer superior or equal to 2, and wherein R is H or a chain alkyl group. R can also be a chain alkyl group having 1 to 3 carbon atoms, such as $CH_3$ or $C_2H_5$. In some examples, m is an integer ranging from 3 to 30, and, in some other examples, m is an integer ranging from 5 to 15. The polyether chain segment (PE) may include repeating units of polyethylene glycol (PEG) chain segment $(—CH_2CH_2—O—)$, or polypropylene glycol (PPG) chain segment $—(CH_2—CH(CH_3)—O—)$, or a mixture of both types. In some examples, the polyether chain segment (PE) contains PEG units $(—CH_2CH_2—O)$;

c) $R^4$ is hydrogen, or a linear or a branched alkyl group. In some examples, $R^4$ is an alkyl group having from 1 to 5 carbon atoms.

Other examples of dispersants, used to disperse metal oxide particles or the insoluble metal salt particles, can also be a polyether alkoxysilane dispersant having the following general Formula (II):

(II)

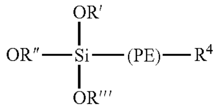

wherein R', R", and R'" are linear or branched alkyl groups. In some examples, R', R", and R'" are linear alkyl groups having from 1 to 3 carbon atoms in chain length. In some examples, R', R", and R'"—$CH_3$ or —$C_2H_5$. $R^4$ and PE are as described above for Formula (I); i.e. PE is a polyether oligomer chain segment of the structural formula: $[(CH_2)_n—CH—R—O]_m$, wherein n is an integer ranging from 0 to 3, wherein m is an integer superior or equal to 2, and wherein R is H or a chain alkyl group; and $R^4$ is hydrogen, or a linear or a branched alkyl group. In some examples, $R^4$ is $CH_3$ or $C_2H_5$.

In some examples, the metal oxide particles or the insoluble metal salt particles, present in the ink composition, are dispersed with polyether alkoxysilanes dispersants. In some other examples, the ink composition encompasses $TiO_2$ particles as metal oxide particles such particles being dispersed in a polyether alkoxysilane dispersants.

Examples of suitable polyether alkoxysilanes include $HO(CH_2CH_2O)_{n'}—Si(OCH_3)_3$; $HO—(CH_2CH_2O)_{n'}—Si(OCH_2CH_3)_3$; $CH_3O—(CH_2CH_2O)_{n'}—Si(OCH_3)_3$; $CH_3O(CH_2CH_2O)_{n'}—Si(OCH_2CH_3)_3$; $C_2H_5O—(CH_2CH_2O)_{n'}—Si(OCH_3)_3$; $C_2H_5O—(CH_2CH_2O)_{n'}—Si(OCH_2CH_3)_3$; $HO—(CH_2CH(CH_3)O)_{n'}—Si(OCH_3)_3$; $HO—(CH_2CH(CH_3)O)_{n'}—Si(OCH_2CH_3)_3$; $CH_3O(CH_2CH(CH_3)O)_{n'}—Si(OCH_3)_3$; $CH_3O—(CH_2CH(CH_3)O)_{n'}—Si(OCH_2CH_3)_3$; $CH_3O—(CH_2CH_2O)_{n'}—Si(CH_3)(OCH_3)_2$; $CH_3O—(CH_2CH_2O)_{n'}—Si(CH_3)_2(OCH_3)$; $CH_3O(CH_2CH_2O)_{n'}—Si(CH_3)(OC_2H_5)_2$; $CH_3O(CH_2CH_2O)_{n'}—Si(CH_3)_2(OC_2H_5)$ wherein n' is an integer equal to 2 or greater. In some examples, n' is an integer ranging from 2 to 30 and, in some other examples, n' is an integer ranging from 5 to 15.

Commercial examples of the polyether alkoxysilane dispersants include, but are not limited to, Silquest® A-1230 manufactured by Momentive Performance Materials, and Dynasylan® 4144 manufactured by Evonik/Degussa.

The amount of dispersant used in the metal oxide dispersions may vary from about 1 wt % to about 300 wt % of the dispersed metal oxide particles content. In some examples, the dispersant content range is between about 2 and about 150 wt % of the metal oxide particles content. In some other examples, the dispersant content range is between about 5 and about 100 wt % of the metal oxides particles content.

Without being linked by any theory, it is believed that ink composition containing metal oxide particles dispersed with alkoxysilane dispersant, such as describe above, improve the jetting reliability of the ink during inkjet printing and also prevent clogging of printhead nozzles. Moreover, it is believed that the presence of the alkoxysilane dispersant prevents kogation (i.e., crusting) on the thermal printhead heater when thermal inkjet printing is utilized.

The ink is based on fine particle of metal oxide dispersion, such as $TiO_2$ dispersion for example, in an aqueous ink vehicle. The dispersion of metal oxide, such as $TiO_2$, can be prepared via milling or dispersing $TiO_2$ powder in water in the presence of suitable dispersant. The metal oxide dispersion, may be prepared by milling commercially available inorganic oxide pigment having large particle size (in the micron range) in the presence of the dispersants, described above, until the desired particle size is achieved. The starting dispersion to be milled is an aqueous dispersion with solid content up to 40% by weight of the metal oxide pigment. The milling equipment that can be used is a bead mill, which is a wet grinding machine capable of using very fine beads having diameter of less than 1.0 mm as the grinding medium, for example, Ultra-Apex Bead Mills from Kotobuki Industries Co Ltd. The milling duration, rotor speed and temperature may be adjusted as known to those skilled in the art to achieve the results desired.

The pH of the ink may be in the range of about 3 to about 11. In some examples, the pH of the ink is from about 5 to about 9 and, in some other examples, from about 5.5 to about 7.5. The pH of the ink composition may be adjusted by addition of organic or inorganic acids or bases, i.e. pH adjusting agent. The ink composition can have a viscosity within the range of about 1.0 to about 10 cps, or within the range of about of about 1.0 to about 7.0 cps, as measured at 25° C., in order to achieve the desired rheological characteristics.

The printed article (100), according to the present disclosure, contains a printable media containing, at, least a bottom supporting substrate (130), an ink-absorbing layer (120) and a metallized top layer (110) with pore diameters that are smaller than the size of the metal oxide particles. The printable recording media is a metallized porous substrate that can be used for inkjet printing. Said media has thus a multilayered structure and is capable of producing a printed feature that exhibits optically variable properties when being printed with the above described ink formulation.

In some embodiments, the metallized printable recording media is a multilayered structure including a metallized top layer (110), an ink-absorbing layer (120) and bottom supporting substrate (130). In some other embodiments, the metallized printable recording media is a multilayered structure including a reflective metal layer (110), a glossy porous layer (140), an ink-absorbing layer (120) and bottom supporting substrate (130). In some examples, the metallized top layer (110) is an optically reflective metal layer with enough porosity to allow penetration of liquid ink vehicle, but that retains metal oxide particles on it surfaces. The metallized top layer has thus pore diameters that are smaller than the size of the metal oxide particles.

In some examples, the thickness of the metallized top layer (110) is in the range of about 5 nm to about 200 nm. In some other examples, the thickness of the metallic reflective top layer (110) is in the range of about 7 to about 150 nm and, in yet some other examples, in the range of about 10 to about 100 nm.

The metallized top layer (110) may be formed from any metal with strong optical reflective properties and conductivity properties and/or and transition metals. In some embodiments, the top layer (110) is formed with metal selected form the group consisting of aluminum (Al), titanium (Ti), silver (Ag), chromium (Cr), nickel (Ni), gold (Au), cobalt (Co), copper (Cu), platinum (Pt), palladium (Pd), rhodium (Rh) and alloys thereof. In some examples, the metallized top layer (110) is formed with Al. In some other examples, the metallized top layer (110) is formed with aluminum (Al).

In some examples, the metallized top layer (110) is formed with aluminum, and has a thickness in the range of about 10 to about 50 nm. In some other examples, the metallized top layer (110) is formed with aluminum and has a thickness in the range of about 10 to about 25 nm. Without being linked by any theory, it is believed that the optimal thickness of the reflective top metal layer depends on the type of metal used.

Metals that tend to form transparent metal oxide film on contact with air (such as Al, Cr, etc.) would require higher coating thickness than those that do not form surface oxide film (such as Ag, Au, Pt, etc.).

Such as illustrated in FIGS. 1 to 4, the printed article (100) contains a metal oxide printed feature (150) and a printable media that encompass a metallized top layer (110), an ink-absorbing layer (120) and bottom supporting substrate (130). In some examples, as illustrated in FIGS. 3 and 4, the printed article (100) further contains a glossy porous protective layer (140) applied over the ink-absorbing layer (120).

The printable media (100) contains an ink-absorbing layer (120). In some examples, the ink-absorbing layer (120) has an absorption capacity (porosity) ranging from about 0.6 to about 1.2 liter/gram; the ink-absorbing layer (120) is thus a porous ink-absorbing layer. The porous ink-absorbing layer (120) can have a coat-weight in the range of about 10 to 40 $g/m^2$ or in the range of about 15 to about 30 $g/m^2$.

The ink-absorbing layer (120) can include inorganic pigments in particulate form and at least one binder. The ink-absorbing layer (120) can include inorganic particulates. Suitable inorganic pigments include metal oxides and/or semi-metal oxides particulates. The inorganic semi-metal oxide or metal oxide particulates may be independently selected from silica, alumina, boehmite, silicates (such as aluminum silicate, magnesium silicate, and the like), titania, zirconia, calcium carbonate, clays, or combinations thereof. The inorganic pigment can be fumed alumina or fumed silica. In some examples, the inorganic pigments particulates are fumed silica (modified or unmodified). Thus, the inorganic particulates pigments can include any number of inorganic oxide groups including, but not limited to silica and/or alumina, including those treated with silane coupling agents containing functional groups or other agents such as aluminum chloro-hydrate (ACH) and those having oxide/hydroxide. If silica is used, it can be selected from the following group of commercially available fumed silica: Cab-O-Sil® LM-150, Cab-O-Sil® M-5, Cab-O-Sil® MS-55, Cab-O-Sil® MS-75D, Cab-O-Sil® H-5, Cab-O-Sil® HS-5, Cab-O-Sil® EH-5, Aerosil® 150, Aerosil® 200, Aerosil® 300, Aerosil® 350, and/or Aerosil® 400.

In some examples, the aggregate size of the fumed silica can be from approximately 50 to 300 nm in size. In some other examples, the fumed can be from approximately 100 to 250 nm in size. The Brunauer-Emmett-Teller (BET) surface area of the fumed silica can be from approximately 100 to 400 square meters per gram. In yet some other examples, the fumed silica can have a BET surface area from approximately 150 to 300 square meters per gram. The inorganic particulates pigments can be alumina (modified or unmodified). In some examples, the alumina coating can comprise pseudo-boehmite, which is aluminum oxide/hydroxide ($Al_2O_3$.n $H_2O$ where n is from 1 to 1.5). Commercially available alumina particles can also be used, including, but not limited to, Sasol Disperal® HP10, Disperal® HP14, boehmite, Cabot Cab-O-Sperse® PG003 and/or CabotSpectrAl® 81 fumed alumina.

In some examples, the ink-absorption layer (120) contains fumed silica or fumed aluminas, which are aggregates of primary particles. In some other examples, the ink absorption layer contains fumed silica or fumed aluminas, which are aggregates of primary particles that have an average particle size ranging from about 120 nm to about 250 nm. The amount of inorganic pigment may be from about 30 to 90 by weight (wt %) based on the total weight of the ink-absorbing layer, or, in some other examples, from about 60 to about 80 wt %.

A binder can be added to the ink-absorption layer (120) to bind the particulates together. In some examples, an amount of binder is added that provides a balance between binding strength and maintaining particulate surface voids and inter-particle spaces for allowing ink to be absorbed. The binders may be selected from polymeric binders, in some examples, the binders are water-soluble polymers and polymer latexes. Examples of binders, for use herein, include, but are not limited to polyvinyl alcohols and water-soluble copolymers thereof, e.g., copolymers of polyvinyl alcohol and poly(ethylene oxide) or copolymers of polyvinyl alcohol and polyvinyl amine; cationic polyvinyl alcohols; aceto-acetylated polyvinyl alcohols; polyvinyl acetates; polyvinyl pyrrolidones including copolymers of polyvinyl pyrrolidone and polyvinyl acetate; gelatin; silyl-modified polyvinyl alcohol; styrene-butadiene copolymer; acrylic polymer latexes; ethylene-vinyl acetate copolymers; polyurethane resin; polyester resin; and combination thereof. In some examples, the binder is polyvinylalcohol with percentage hydrolysis between 80 to 90% and 4% viscosity higher than 30 cps at 25° C. Examples of binders include Poval® 235, Mowiol® 40-88 (products of Kuraray and Clariant). In some examples, the binder may be present in an amount representing of about 5 wt % to about 30 wt % by total weight of the ink-absorbing layer (120).

The printable media (100) contains a supporting substrate (130) that acts as a bottom substrate layer. The porous ink-absorbing layer (120) forms a coating layer on said supporting substrate (130) and, in other word, forms a recording material that is well adapted for inkjet printing device. The supporting substrate (130), which supports the porous ink-absorbing layer (120), may take the form of a sheet, a web, or a three-dimensional object of various shapes.

The supporting substrate (130) can be of any type and size. The supporting substrate (130) can be any material that will be able to provide a mechanical support to the above mentioned layers. In some examples, the supporting substrate can be a flexible film or a rigid paper substrate. As non-limiting examples, the supporting substrate (130) may be selected from cellulosic or synthetic paper (coated or uncoated), cardboard, polymeric film (e.g. plastic sheet like PET, polycarbonate, polyethylene, polypropylene), fabric, cloth and other textiles. In some other examples, the bottom substrate layer may be single material plastic film made from PET, polyimide or another suitable polymer film with adequate mechanical properties. In some examples, the supporting substrate (130) includes any substrate that is suitable for use in digital color imaging devices, such as electrophotographic and/or inkjet imaging devices, including, but in no way limiting to, resin coated papers (so-called photobase papers), papers, overhead projector plastics, coated papers, fabrics, art papers (e.g. water color paper), plastic film of any kind and the like. The substrate includes porous and non-porous surfaces. In some other examples, the supporting substrate (130) is paper (non-limitative examples of which include plain copy paper or papers having recycled fibers therein) or photopaper (non-limitative examples of which include polyethylene or polypropylene extruded on one or both sides of paper), and/or combinations thereof.

In some examples, the supporting substrate (130) is a photobase. Photobase is a coated photographic paper, which includes a paper base extruded one or both sides with polymers, such as polyethylene and polypropylene typical coat weight of the extruded polymer layers is from 5 to 45 gsm. Photobase support can include a photobase material including a highly sized paper extruded with a layer of polyethylene on both sides. In this regard, the photobase support is an opaque water-resistant material exhibiting qualities of silver halide paper. In some examples, the photobase support includes a polyethylene layer having a thickness of about 10 to 24 grams per square meter (gsm). The photobase support can also be made of transparent or opaque photographic material. In some examples, the ink-absorbing layer (120) are disposed on the supporting substrate (130) and form a coating layer having a coat weight which is in the range of about 10 to about 75 gram per square meter ($g/m^2$) per side. In some examples, the supporting substrate (130) has a thickness along substantially the entire length ranging between about 0.025 mm and about 0.5 mm.

In some examples, the printable media can include a glossy porous layer (140). Said layer (140) is a protective porous layer that is applied over the ink-absorbing layer (120). In some examples, the glossy protective layer is a porous layer having pore diameters that are smaller than that of the pigment particles of ink composition applied to form the metal oxide printed feature (150). In some examples, the glossy protective layer is a porous layer having pore diameter in the range of about 3 to about 150 nm. In some other examples, the glossy protective layer is a porous layer having pore diameter in the range of about 3 to about 20 nm.

Without being linked by any theory, it is believed that this layer help to maximize retention of metal oxide particles on the media surface, as well as to boost the specular reflectivity of the printed feature (150). In some examples, the coat weight of the glossy protective layer (140) can be from about 0.1 $g/m^2$ to about 2 $g/m^2$ and, in some other examples, the coat weight of the glossy protective layer can be from about 0.25 $g/m^2$ to about 1.0 $g/m^2$.

The glossy protective layer (140) can contain inorganic colloidal particles such as colloidal particulates of metal oxides and semi-metal oxides or colloidal silica particles and water-soluble binders, such as polyvinylalcohol or copolymers of vinylpyrrolidone. The particle size, as measured by diameter, of the inorganic colloidal particles, present in the glossy protective layer (140), can be from about 5 nm to about 150 nm. In some examples, the particle size can be from about 20 nm to about 100 nm. In some other examples, the particle size can be from about 30 nm to about 80 nm. The inorganic colloidal particles suitable for the glossy protective layer (140) are discrete, single particles and are not aggregates of primary particles. Inorganic colloidal particles can be selected from the group consisting of silica, aluminum, clay, kaolin, calcium carbonate, talc, titanium dioxide and zeolites. In some examples, inorganic colloidal particles present in the glossy protective layer (140) can be inorganic oxide colloidal particles such as colloidal silica, aluminum oxides (boehmites), and mixture of them. In some other examples, the inorganic colloidal particles are colloidal silica particles. In some examples, layer (140) contains spherical colloidal silicas with particle size ranging from about 30 to about 80 nm. In some other examples, the porosity of the glossy porous layer is less than about 0.2 liter/gram.

The porous layer (140) can contain binders. Such binders can be polyvinylalcohol or copolymer of vinylpyrrolidone. The copolymer of vinylpyrrolidone can include various other copolymerized monomers, such as methyl acrylates, methyl methacrylate, ethyl acrylate, hydroxyethyl acrylate, hydroxyethyl methacrylate, ethylene, vinylacetates, vinylimidazole, vinylpyridine, vinylcaprolactams, methyl vinylether, maleic anhydride, vinylamides, vinylchloride, vinylidene chloride, dimethylaminoethyl methacrylate, acrylamide, methacrylamide, acrylonitrile, styrene, acrylic acid, sodium vinylsulfonate, vinylpropionate, and methyl vinylketone, etc. The glossy protective layer (140) can contain colloidal silica and greater than 5 wt % of polyvinylalcohol. In some examples, binders can be present in the layer (140) at from about 0 wt % to about 15 wt % by weight based on the total dry weight of inorganic colloidal particles. In some examples, the weight percentage of binder, based on the total dry weight of inorganic colloidal particles, is ranging from about 5 to about 12 wt %.

In some examples, such as illustrated in FIG. 3, the glossy porous protective layer (140) and the ink-absorbing layer (120) are applied to only one side of the supporting substrate (130). If the coated side is used as an image-receiving side, the other side, i.e. backside, may not have any coating at all, or may be coated with other chemicals (e.g. sizing agents) or coatings to meet certain features such as to balance the curl of the final product or to improve sheet feeding in printer. In some other examples, such as illustrated in FIG. 4, the glossy porous protective layer (140) and the ink-absorbing layer (120) are applied to both opposing sides of the supporting substrate (130). The double-side coated media has a sandwich structure, i.e., both sides of the supporting substrate (130) are coated with the same coating and both sides may be printed with metal oxide printed feature (150).

In some embodiments, the printable media can be an inkjet textured media. By texture media, it is meant herein a media with macroscopically textured surface. As textured surface, it is meant herein that the surface is not smooth and presents apparent physical features. The sizes of the texture features on the media surface are macroscopic features, i.e. large enough to be seen by human eye from normal viewing distance. In some examples, as regular human eye can resolve features as small as 0.35 mm from 1 m viewing distance, the average size of texture features on the media surface are superior to, at least, about 0.3 mm.

In some examples, when the textured media is used, a textured printed article is obtained. The texture printable media can be obtained by embossing a pattern into media via passing said media between rollers with patterned surface. Thus, the printed article is a textured printed article with optically variable properties and has a metallic appearance. With application of the light onto the reflective textured printed article, its angles of specular reflection are varying with texture topography. Therefore, variations of the reflective angles create multiple specular reflections off the print surface.

In some embodiments, a method for forming a printed article with optically variable properties encompasses: providing an ink composition that contains metal oxide particles that have an average particle size in the range of about 3 to about 180 nm and that have a refractive index superior or equal to 1.2; providing a printable media, which contains a bottom supporting substrate, an ink-absorbing layer and a metallized top layer with pore diameter that are smaller than the size of the metal oxide pigment particles; and jetting said inkjet composition onto said printable media wherein the printed feature interacts with the reflective top metal layer to produce optically variable properties. In some examples, the printable media has, in addition, glossy porous protective layer (140) with pore diameters that are smaller than that of the pigment particles of ink composition applied to form the metal oxide printed feature (150).

The projection of the stream of droplets of ink composition, onto the printable media, can be done via inkjet printing technique. The ink composition may be established on the material via any suitable inkjet printing technique. Non-limitative examples of such inkjet printing technique include thermal, acoustic, continuous and piezoelectric inkjet printing. By inkjet composition, it is meant herein that the composition is very well adapted to be used in an inkjet device and/or in an inkjet printing process. In some examples, the ink composition, containing metal oxide particles that have an average particle size in the range of about 3 to about 180 nm and having a refractive index superior or equal to 1.2, is ejected from an inkjet printhead (piezo or thermal) onto the printable media.

Figure 5A:
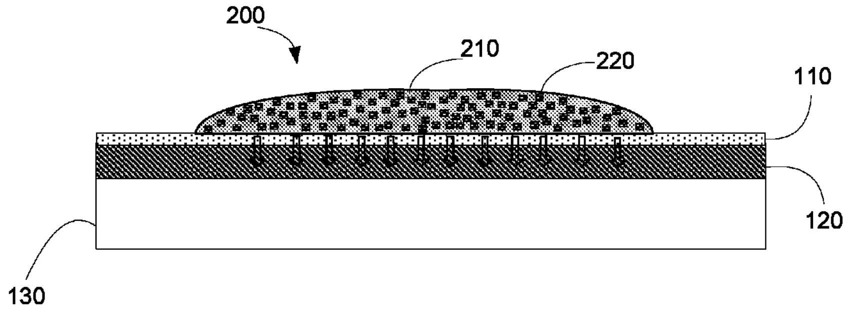
FIGS. 5A and 5B are cross-sectional views of the printable media when the ink composition is applied in view of forming the printed article according to some embodiments of the present disclosure.
Figure 5B:
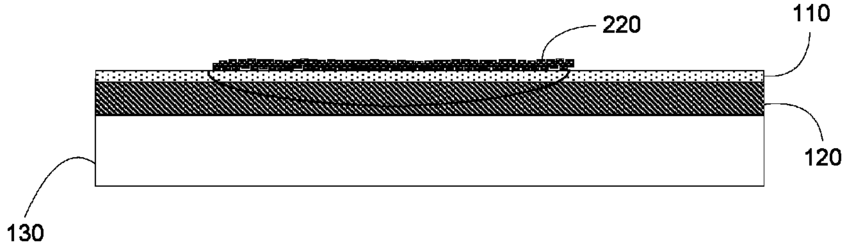

In some examples, such as illustrated in FIGS. 5A et 5B, the ink composition (200), containing a liquid phase (210) and metal oxide particles (220), is projected onto a printable media containing a bottom supporting substrate (130), a porous ink-absorbing layer (120) and a metallized top layer (110) with pore diameter that are smaller than the size of the metal oxide pigment particles. Such as illustrated in FIG. 5A, the liquid phase (210) of the ink composition (200) penetrates through the pores of the top reflective metal layer (110) and further into the ink-absorbing layer (120). The metal oxide particles (220) cannot penetrate through the surface pores and are retained on top of the reflective metal layer (110). Without being linked by any theory, it is believed that the combination of small pore size and high absorbing capacity of the layers helps to develop a significant capillary pressure (from about 200 or 300 psi up to about 1000 or 2000 psi as calculated by Young-Laplace equation) on the metal oxide particles accumulating on the metal surface. As illustrated in FIG. 5B, the capillary pressure developed by the suction action of the ink-absorbing layer (120) compacts the metal oxide particles (220) deposited on the reflective metal layer (110), resulting in a flat, dense film of metal oxide particles that helps to form the printed features (150).

The resulting printed article forms thus a uniform coating layer, or printed features (150), on the printable media, that exhibits optically variable properties and that is optically transparent. The ink composition used herein, when used alone and not in combination with the specific media, does not have optically variable properties, i.e. does not have any dichroic or color-shifting properties. The optically variable properties of the printed article are thus the result of the ink's interaction with the reflective metal top surface of the printable media.

Figure 6:
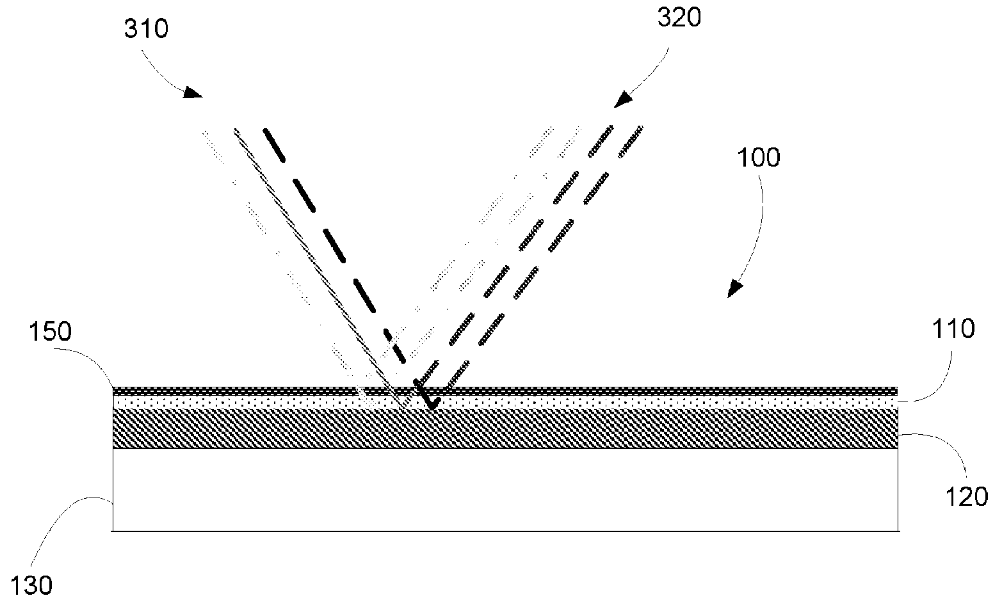
FIG. 6 is a cross-sectional view of a printed article according to some embodiments of the present disclosure illustrating the optically variable properties when light is applied.

FIG. 6 illustrates the incident light (310) and the reflected light (320) when light is applied to the printed media (100) of the present disclosure. Such as illustrated in FIG. 6, the metal oxide printed feature (150) printed on the media and containing metal oxide particulates with refractive index superior or equal to 1.2, results in a strong specular reflection of incident light (310) from both the top surface of the printed feature (150) and from the interface between the printed feature (150) and the reflective metal layer (110). As illustrated in FIG. 6, the printed media containing the metal oxide printed feature (150) forms a simple dichroic filter on the surface of the printable media. The printed feature (150) has thus optically variable properties and exhibits "color shifting" property. Such color-shifting property refers to the fact that the printed feature reflects various wavelengths in white light differently, depending on the angle of incidence to the surface. An unaided eye will observe this effect as a change of color while the viewing angle is changed. Without being linked by any theory, it is believed that the difference in optical path of reflected light results in constructive or destructive interference, depending on the wavelength, i.e. enhances the reflectivity for certain wavelengths and reduces it for others. This spectral discrimination is perceived by the human eye as the appearance of color. For different angles of view, the difference in optical path changes, which makes the layered material exhibit angle-dependent color.

Chromatic interference of light reflected from the top surface of the metal oxide printed feature (150) and from the bottom surfaces of the printed feature (150) produces a color-shifting (optically variable) effect when the viewing angle of the printed object is changed. The presence of reflective metal layer (110) beneath the metal oxide printed feature (150) enhances the specular reflection and the optical variable behavior of the printed film. Accordingly, an array of colors can be produced by manipulating the thickness of the metal oxide printed feature (150) of the printable media. A variation in film thickness of the metal oxide printed feature (150) sitting on the top metallized layer (110) of the printable media affects the chromatic interference of ambient white light and can be manipulated to yield a multi-colored, rainbow effect of the printed film. In some examples, the thickness of the refractive metal oxide film created during printing may be manipulated by adjusting the metal oxide content in the ink, or by adjusting the jetted ink flux (the amount of the ink jetted per area unit of the printable media) by controlling the writing system of the inkjet printer.

In some examples, the printed feature (150) may be printed to cover a portion of the reflective metal layer (110) of the printable media (100) so as to form an optically variable feature, which may include a pattern or text, or it may be printed to form a continuous film covering the entire reflective metal layer (110) of the printable media (100).

The preceding description has been presented only to illustrate and describe exemplary embodiments of the present invention. However, it is to be understood that the following are only exemplary or illustrative of the application of the principles of the present print media and methods.

EXAMPLE

A printed article with optically variable properties is made via printing of a colorless ink composition containing $TiO_2$ particles onto the top surface of a printable media by means of a thermal inkjet printhead.

An ink composition is prepared based on a $TiO_2$ dispersion. The dispersion is made based on the mix of metal oxide particles, $TiO_2$ (Ti-Pure® R931, available from DuPont) with a dispersant (Silquest® A-1230, available from "Momentive Performance Materials") at dispersant/metal oxide particles ratio equal to about 0.5. The dispersion results in ink composition containing about 12 wt % of metal oxide particles ($TiO_2$). The average particle size of $TiO_2$ is of about 32 nm (as measured by "Nanotrack" particle size analyzer). The ink formulation is illustrated in the table (a) below. All percentages are expressed in wt % of the total composition.

TABLE (a)

| Ink formulation | Wt % |
|---|---|
| $TiO_2$ Dispersion | 33.3 |
| LEG-1 | 5.0 |
| 2-Pyrrolidinone | 9.0 |
| Trizma ®Base | 0.2 |
| Proxel ®GXL | 0.1 |
| Surfynol ®465 | 0.2 |
| Water | Up to 100% |

LEG-1 is a co-solvent available from Liponics. Trizma® Base is available from Sigma Aldrich Inc. Proxel® GXL is a biocide available from Avecia Inc. Surfynol® 465 is a surfactant available from Air Products.

A printable recording media is produced with a single pass (wet-on-wet) coating method using a curtain coater. The metallized top layer, the ink-absorbing layer and, eventually, the glossy layer, are applied onto a photobase used for manufacturing HP Advanced photopaper as supporting substrate (166 or 171 g/m$^2$ raw base paper). The ink-absorbing layer is applied first to the front side of the photopaper with a roller coater. When present, the glossy layer is coated on the top of the ink-absorbing layer. The coat weight of the ink-absorbing layer is from about 10 to about 40 gsm and the coat weight of the glossy layer is from about 0.1 to about 2 gsm.

The reflective metallized top layer is made by depositing 15 nm of Aluminum, as the reflective material, on the top of the printable media. The Aluminum has 99.99% purity and is available from Kurt J. Lesker Company. The deposition is performed using a CHA Industries (Freemont, Calif., USA) MARK 50 evaporative deposition system. Electron beam evaporation, at a rate of 0.1 nm per second, is used to deposit a porous film of 15 nm thick. Deposition rate is controlled using a closed loop controller and quartz crystal microbalance. Deposition occurs at room temperature, with the deposition chamber pressure at $3.0 \cdot 10^{-6}$ Torr and with an evaporation source to substrate spacing of 810 mm.

The formulations of the different coating layers are expressed in the Table (b) below. Each number represent the part per weight of each components present in each layer.

TABLE (b)

| Layer | Ingredients | Media A | media B |
|---|---|---|---|
| metalized top layer | Aluminum | 100 | 100 |
| Coating thickness | | 15 | 15 |
| Glossy protective layer | Disperal ®HP-14 | 75 | — |
| | Cartacoat ®K303C | 25 | — |
| | PVA 2 | 11 | — |
| Coat-weight | | 0.5 gsm | — |
| ink-absorbing layer | Treated Silica | 100 | 100 |
| | PVA 1 | 21 | 21 |
| | Boric Acid | 2.5 | 2.5 |
| | Silwet ®L-7600 | 0.5 | 0.5 |
| | Glycerol | 1.5 | 1.5 |
| | Zonyl ®FSN | 0.1 | 0.1 |
| Coat-weight | | 28 gsm | 28 gsm |

Treated silica 1 is Cab-O-Sil® MS-55 (available from Cabot) treated with ACH and Silquest® A-1110. PVA 1 is Poval® 235 available from Kuraray. PVA 2 is Mowiol® 40-88 available from Kuraray. Zonyl® FSN is a fluorosurfactants available from DuPont Inc. Cartacoat® K303C is a cationic colloidal silica available from Clariant. Disperal® HP-14 is boehmites available from Sasol technologies Inc. Silwet® L-7600 is a surfactant from GE silicone Inc.

The ink, such as described in table (a) of this example, is printed onto the media A, described in table (b), using a HP Black Print Cartridge 94, in a HP Photosmart 8450 printer. The print substrate used is “HP Advanced Photo Paper”. The resulting printed article presents optically variable properties such as chromatic interference of ambient white light and results in the rainbow coloration.

The invention claimed is:

1. A printed article with optically variable properties comprising a printable media on which a printed feature has been formed with an ink composition wherein:

a. said ink composition comprises metal oxide particles that have an average particle size in the range of about 3 to about 180 nm and that have a refractive index superior or equal to 1.2;

b. said printable media contains a bottom supporting substrate, an ink-absorbing layer and a metallized top layer with pore diameters that are smaller than the size of the metal oxide particles;

c. and wherein the ink composition forms onto said printable media a printed feature that exhibits optically variable properties.

2. The printed article with optically variable properties of claim 1 wherein the printed feature has been formed via inkjet printing technique.

3. The printed article with optically variable properties of claim 1 wherein the ink composition forms, onto the printable media, a printed feature that has a thickness that is between about 40 nm and about 600 nm.

4. The printed article with optically variable properties of claim 1, wherein the ink composition forms, onto the printable media, a printed feature that has a density in the range of about 3 to about 80 $\mu g/cm^2$.

5. The printed article with optically variable properties of claim 1 wherein the printable media has a metallized top layer that has a thickness in the range of about 5 to about 200 nm.

6. The printed article with optically variable properties of claim 1 wherein the printable media has a metallized top layer that is formed with aluminum (Al).

7. The printed article with optically variable properties of claim 1, wherein the printable media further comprises a glossy porous protective layer that is applied over the ink-absorbing layer.

8. The printed article with optically variable properties of claim 1, wherein the metal oxide particles, that are present in the ink composition, are selected from the group consisting of $TiO_2$, $Al_2O_3$, ZnO, $ZrO_2$ and $AlPO_4$.

9. The printed article with optically variable properties of claim 1, wherein the metal oxide particles, that are present in the ink composition, are $TiO_2$.

10. The printed article with optically variable properties of claim 1, wherein the metal oxide particles, that are present in the ink composition, have an average particle size ranging from about 5 to about 150 nm.

11. The printed article with optically variable properties of claim 1, wherein the ink composition comprises an ink liquid vehicle and a colloid dispersion of metal oxide particles, said dispersion of particles represents from about 0.1 to about 25 wt % of the total weight of the ink composition.

12. The printed article with optically variable properties of claim 1 wherein the metal oxide particles, present in the ink composition, are dispersed with dispersants.

13. The printed article with optically variable properties of claim 1 wherein the metal oxide particles, present in the ink composition, are dispersed with polyether alkoxysilanes dispersants.

14. The printed article with optically variable properties of claim 1 wherein the ink composition contains $TiO_2$ particles as metal oxide particles, such particles being dispersed in a polyether alkoxysilane dispersant.

15. A method for forming a printed article with optically variable properties such as defined in claim 1 comprising:

a. providing an ink composition that contains metal oxide particles that have an average particle size in the range of about 3 to about 180 nm and that have a refractive index superior or equal to 1.2;

b. providing a printable media, which contains a bottom supporting substrate, an ink-absorbing layer and a metallized top layer with pore diameter that are smaller than the size of the metal oxide pigment particles;

c. and jetting said inkjet composition onto said printable media wherein the printed feature interacts with the top metallized layer to produce optically variable properties.

* * * * *